United States Patent [19]
Foster et al.
[11] 3,729,711
[45] Apr. 24, 1973

[54] SHIFT APPARATUS FOR SMALL COMPUTER

[75] Inventors: James H. Foster, Jasper, Ontario; John Peter Dufton, Brockville, Ontario, both of Canada

[73] Assignee: Automatic Electric Laboratories, Inc., Northlake, Ill.

[22] Filed: Dec. 29, 1970

[21] Appl. No.: 102,462

[52] U.S. Cl. .......... 340/172.5
[51] Int. Cl. .......... G06f 7/00
[58] Field of Search .......... 340/172.5; 179/18 ES

[56] References Cited

UNITED STATES PATENTS

| | | | |
|---|---|---|---|
| 3,618,037 | 11/1971 | Wollum et al. | 340/172.5 |
| 3,618,031 | 11/1971 | Kennedy et al. | 340/172.5 |
| 3,596,251 | 7/1971 | Buchan et al. | 340/172.5 |

OTHER PUBLICATIONS

7080 Data Processing Machine-Reference Manual (pp. 25-35, 35-41 & 45-50) A-22-6560-1, 1961; IBM Corp. Poughkeepsie, N.Y.

*Primary Examiner*—Harvey E. Springborn
*Attorney*—K. Mullerheim, B. E. Franz and Theodore C. Jay, Jr.

[57] ABSTRACT

Store registers for temporary memory comprise flip-flops with input gating connections to a store bus and output gating connections via storage readout circuits to a load bus. Each store register has an input control gate with address connections enabled during execution of an instruction for a STORE operation with its address as the operand to store data therein from the store bus; and address connections to its individual storage readout circuit to load data from it via the load bus during execution of a LOAD instruction with its address as operand. One of the store registers SA is provided with two extra storage readout circuits for shift left and shift right functions, each having its own individual address, so that data which has been stored into store register SA may be loaded, shifted left or right during execution of a LOAD instruction with the operand address of the storage readout circuit for that function.

2 Claims, 8 Drawing Figures

INVENTORS
J. PETER DUFTON
JAMES H FOSTER
BY Bernard E. Franz
ATTORNEY

SHIFT APPARATUS FOR SMALL COMPUTER

BACKGROUND OF THE INVENTION

1. Field of the Invention

This invention relates to shift apparatus for a small computer, and more particularly to apparatus for use in a small real-time-control data processing system.

2. Description of the Prior Art

The shift and rotate functions in a computing system involve moving data to different bit positions within a word. These functions are often implemented by interconnections of flip-flops in an accumulator register or one of the other registers of the central processor circuits; and usually require special operation codes of the instruction set. However, in a small computer it may not be economical to provide a special shift register for these functions, and there may be undue complexity in adding the shift function to the accumulator or other registers. Furthermore, it may not be feasible or desirable to add special operation codes. In particular if it is decided to add the shift or rotate functions to an existing design, these modifications may be particularly complex or expensive.

SUMMARY OF THE INVENTION

This invention relates to a central processor which in addition to the main portion of the memory which stores the program and data, also includes a number of store registers which are given addresses and provided with access as a part of the memory for temporary storage of data, each of these storage registers comprising bistable devices such as flip-flops, having input gate circuits connected via a store bus to the output of an accumulator, with address connections to store data from the accumulator into a store register designated by an operand address for instructions having a write-control operation code, and each store register having a storage readout circuit comprising gates connecting the output of the store register to a load bus which is coupled to the input of the accumulator, with address connections to load data from the store register designated by an operand address into the accumulator for instructions having read-control operation code; wherein one of the store registers is provided with extra storage readout circuits for shift functions, each extra readout circuit having its own individual address so that the instruction using a read-control operation code and the address of one of the extra readout circuits may be used to shift data in accordance with special connections to the load bus. For example in a system in which words are organized into digits of four bits (binary digits), one of the extra storage readout circuits for the shift left function may couple the output of each flip-flop of the store register to a conductor of the load bus corresponding to four bits more significant and connections to load zero's onto the four least significant bit conductors; while a storage readout circuit for the shift right function has connection to load zero' s onto the four most significant bit conductors of the load bus and connections from the flip-flops to couple each to conductors of four bits less significant. For rotate functions, instead of connections to load zero's, connections would be made to the four flip-flops at the other end of the store register, according to whether a rotate left or a rotate right function were being implemented.

CROSS-REFERENCES TO RELATED APPLICATIONS

This invention is related to the Small Exchange Stored Program Switching System by R. W. Duthie and R. M. Thomas disclosed in U.S. Pat. No. 3,487,173 issued December 30, 1969. The memory arrangement of the system, and particularly the storage readout circuits SR for reading from temporary memory stores is disclosed in the U.S. patent application Ser. No. 883,062 filed Dec. 8, 1969 now Patent 3,587,070 issued June 22, 1971 by R. M. Thomas for a Memory Arrangement Having Both Magnetic-Core and Switching-Device Storage with a Common Address Register. The arrangement using the SCAN operation code disclosed herein is covered by U.S. patent application Ser. No. 102,414 filed Dec. 29, 1970 by J. P. Dufton and B. G. Hallman for Computer Having Associative Search Apparatus.

DETAILED DESCRIPTION

Figure 1:
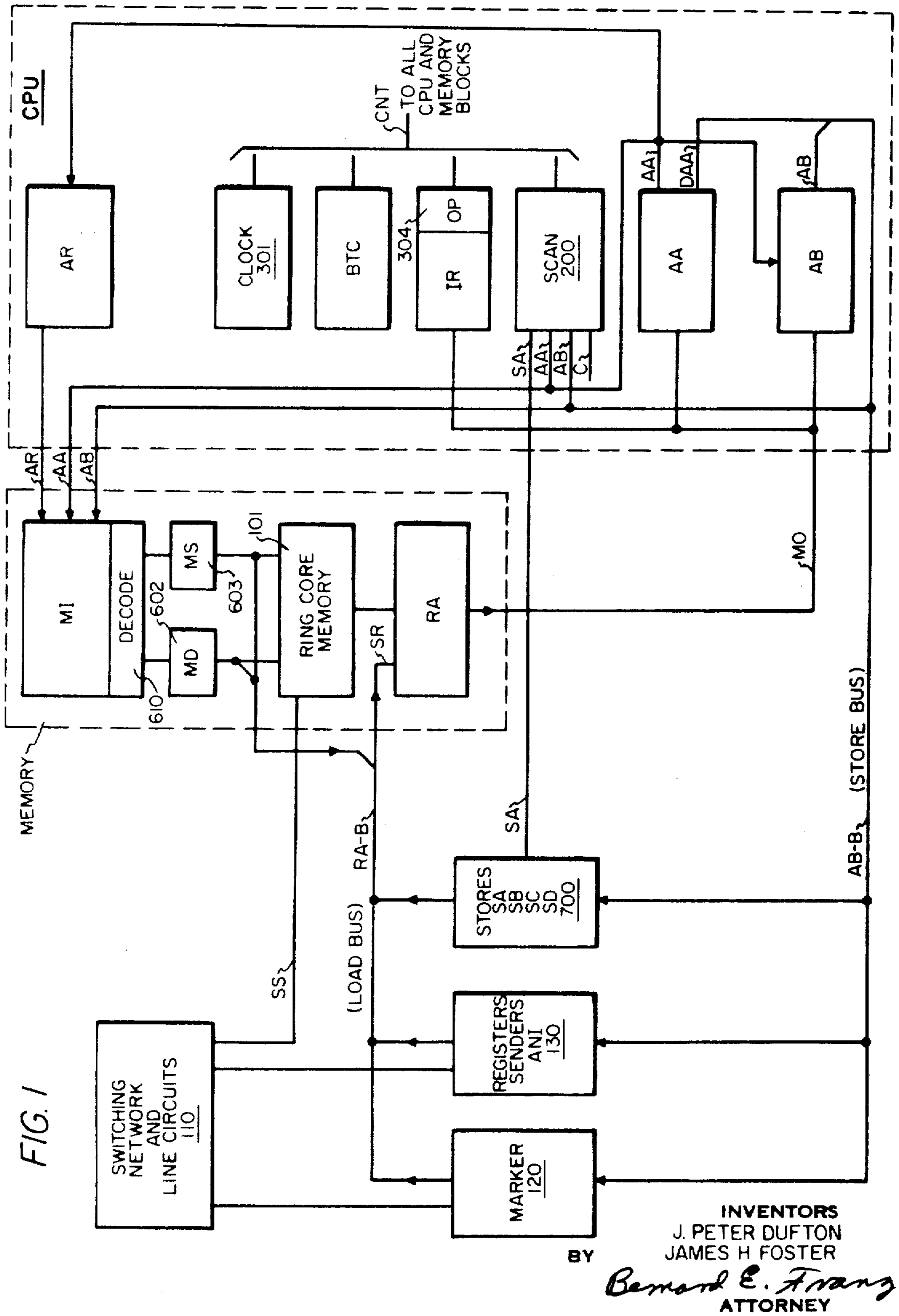
FIG. 1 is a block diagram of a telephone switching system, showing particularly the central processing unit, the memory, and subsystems which include temporary memory registers.

As shown in the block diagram of FIG. 1, the data processing system includes a memory and a central processing unit CPU. The central processing unit includes a clock 301 for supplying the basic timing signals, a bit time counter BTC which supplies the signals for the operation cycle for each instruction, an instruction register IR with an operation code (OP) decoder 304 which supplies the operation code for controlling the logic circuits, accumulator registers AA and AB, an address register AR and a SCAN unit 200.

The memory subsystem comprises basically a ring-core memory 101, with a memory input register MI having decoding circuits 610 for supplying input signals to memory drivers 602 and memory switches 603, and output read amplifiers RA. Storage register (SA, SB, SC and SD) 700 may be considered to be part of the central processing unit, and are connected to the memory drivers and memory switches, and to the read amplifiers to form a portion of the temporary memory for the system.

The data processing system forms part of a telephone switching system to control a switching network and line circuits 110. A marker 120 contains registers forming part of the temporary memory of the system, and has circuits for controlling the switching network 110. The system also includes registers, senders and ANI (Automatic Number Identification) units 130 which also include registers forming part of the temporary memory, and have connections to the switching network 110.

Figure 6:
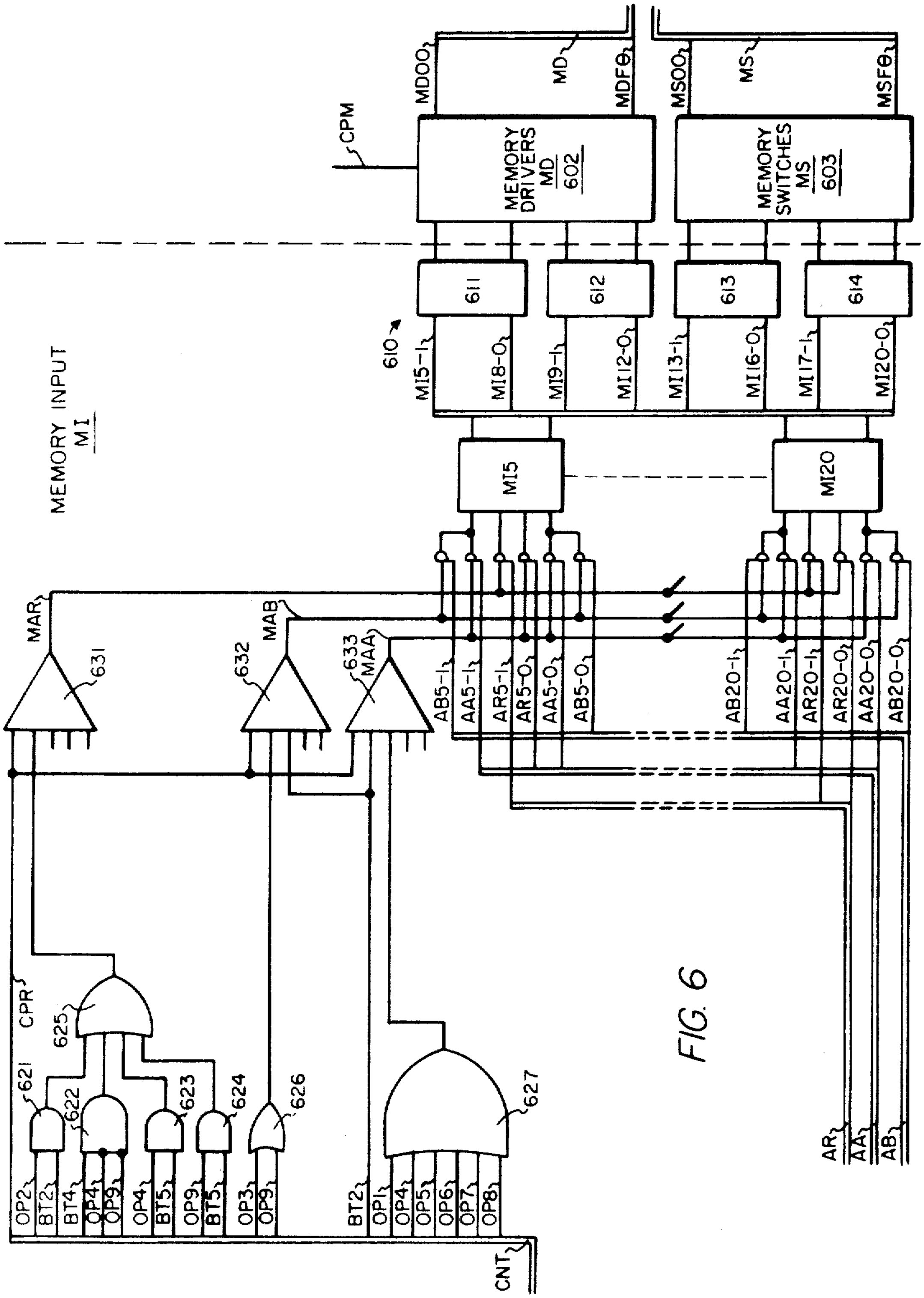
Figure 7:
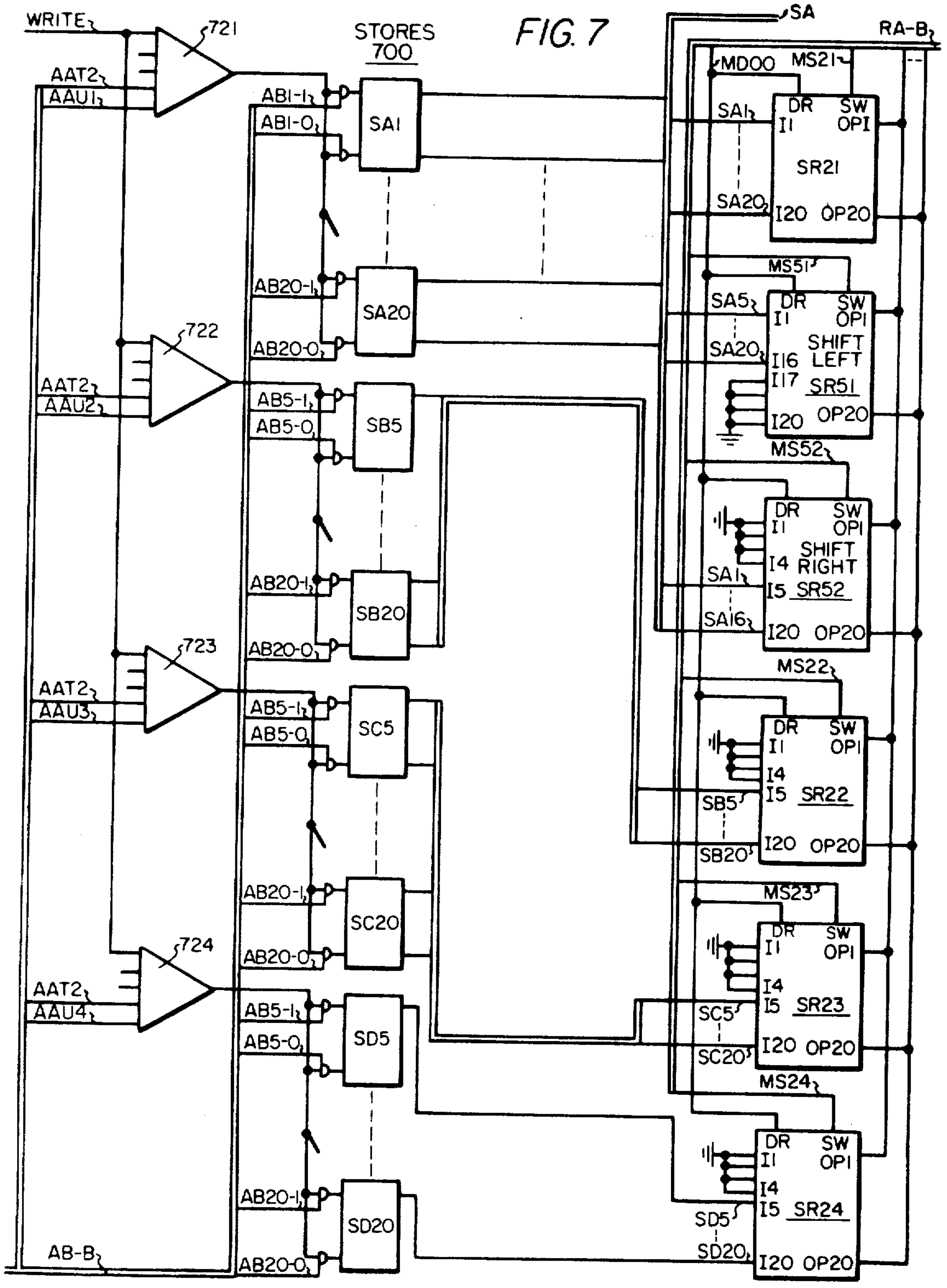

The arrangement shown in FIG. 1 represents a modification of the Small Exchange Stored Program Switching System disclosed in said Duthie et al patent. In that patent the central processing unit is shown in FIGS. 6 and 7. The clock 301, bit time counter BTC and instruction register 303 with decoder 304 shown herein correspond to the clock 601, bit time counter 602, instruction register flip-flops IR1–4 and OP code decoder 605 shown in the patent. The address register AR corresponds to the current address counter comprising flip-flops CAC5–20 in the patent. The accumulator AA herein replaces the memory output register flip-flops MOR1–20 and the address portion IR5–20 of the instruction register of the patent. The accumulator AB herein corresponds generally to the accumulator flip-flops ACC1–20 and associated arithmetic circuits in FIG. 7 of the patent. The memory input register MI and decoding circuits 610 correspond generally to the circuits shown in FIG. 2 of the patent. The modifications of the memory output circuits as used in the system of FIG. 1 herein are disclosed in detail in the said memory arrangement patent application by Thomas. There are detailed modifications of all of the circuits of FIG. 1 with respect to those disclosed in the Duthie et al patent.

The basic logic circuits used herein are generally the same as those disclosed in the Duthie et al patent. The logic levels are a negative eight volts for 1, and ground potential for 0. An open circuit is also used for the logic level 1, the output of a logic module generally being from the unbiased collector electrode of a transistor which is in the cutoff condition for the 1 state, and the negative biasing potential being supplied at the inputs of the succeeding logic modules. The clock pulses as now used in the system comprise trains of negative pulses, which are a train of pulses on the lead CPM (FIG. 3) of three microseconds duration recurring every 10 microseconds and a train of pulses on lead CPR of 0.7 microseconds, with the leading edge of the CPR pulses occuring in coincidence with the trailing edges of the CPM pulses. The actual logic circuits as used in the system are principally NOR gates, but are disclosed herein as AND and OR gates to improve the clarity. As stated at column 5 of the Duthie et al patent, some of the building block circuits are disclosed in Prescher et al. U.S. Pat. No. 3,173,994, FIG. 21. The symbols for the AND and OR gates as used herein have been changed to conform to current practice. Referring for example to FIG. 4, block 413 represents an AND gate and block 415 represents an OR gate, with a circle at an input or output as shown for example at gate 414 representing an inversion or inhibit function. The gated pulse amplifier circuits such as 411 are generally similar to circuit 201 shown in FIG. 5 of the Duthie et al patent, except for the number of DC control inputs. The upper input of the circuit is an AC clock pulse input and the lower four inputs are DC control inputs connected as an AND function. Therefore when all four of the inputs are at the logic level 1 or open circuited a clock pulse at the upper input is gated and amplified to the output. The various decoding circuits generally comprise AND gates such as that shown in block 511 of the Duthie et al patent. The flip-flops such as AR5 have a number of set inputs shown on the left side of the upper half and a number of reset inputs shown on the left side of the lower half. Each input is from a coincidence gate represented by a small semicircle on which the input at the center left is an AC clock input and the input from the top or bottom of the left side is a DC control input, with the DC input required to be present for a certain time before the occurence of the clock pulse input to be effective to change the state of the flip-flop.

There are several gates and gated pulse amplifiers actually used in the system, not shown herein, which are used for amplification and distribution of the signals. For example the busses include several such gating circuits to different groups of units, and also separately to odd and even numbered units for reliability. Thus connections disclosed and claimed herein, while shown as simple conductors, may in actual practice include circuits which repeat the signals.

A memory word comprises twenty bits organized as five digits of four bits each. For instruction words, the first digit is the operation code and the other four digits are an operand address.

The operation codes (OP codes) with their assembler mnemonics are as follows:

LOAD (OP 1) — read the contents of the operand memory address location and place the result in the accumulator AB.

STORE (OP 2) — write the contents of the accumulator AB into the operand memory address location.

TRANS (OP 3) — transfer the contents of the address location stored in the accumulator AB into the accumulator AB. (The operand part of the instruction is blank).

COMP (OP 4) — compare the contents of the accumulator AB with the contents of the operand address location as read into accumulator AA. If equal, proceed to the next instruction in sequence by incrementing the address register by 1 as normal. If unequal, skip one address in the program.

ADD (OP 5) — add 1, 10 or 100 (literals stored at operand address location) to the contents of the accumulator AB.

BR (OP 6) — branch to the instruction at the operand address location.

MASK (OP 7) — mask the contents of the accumulator AB with the contents from the operand address location as read into accumulator AA. Keep the digit where one's are present and set to zero where zero's are present (logical AND).

SUPER (OP 8) — superimpose on the accumulator AB the contents of the operand memory address as read into accumulator AA (logical OR).

SCAN (OP 9) — make an associative search beginning with the address in the accumulator AB. (The operand part of the instruction is blank). When the contents of the accumulator AA compare with the contents of the storage register SA, the search is completed and the next address is used. When the contents of accumulator AB and a wired constant C compare, skip one address in the program. Note that the necessary data must be placed in the register SA and the accumulator AB before this OP code is called upon.

Figure 2:
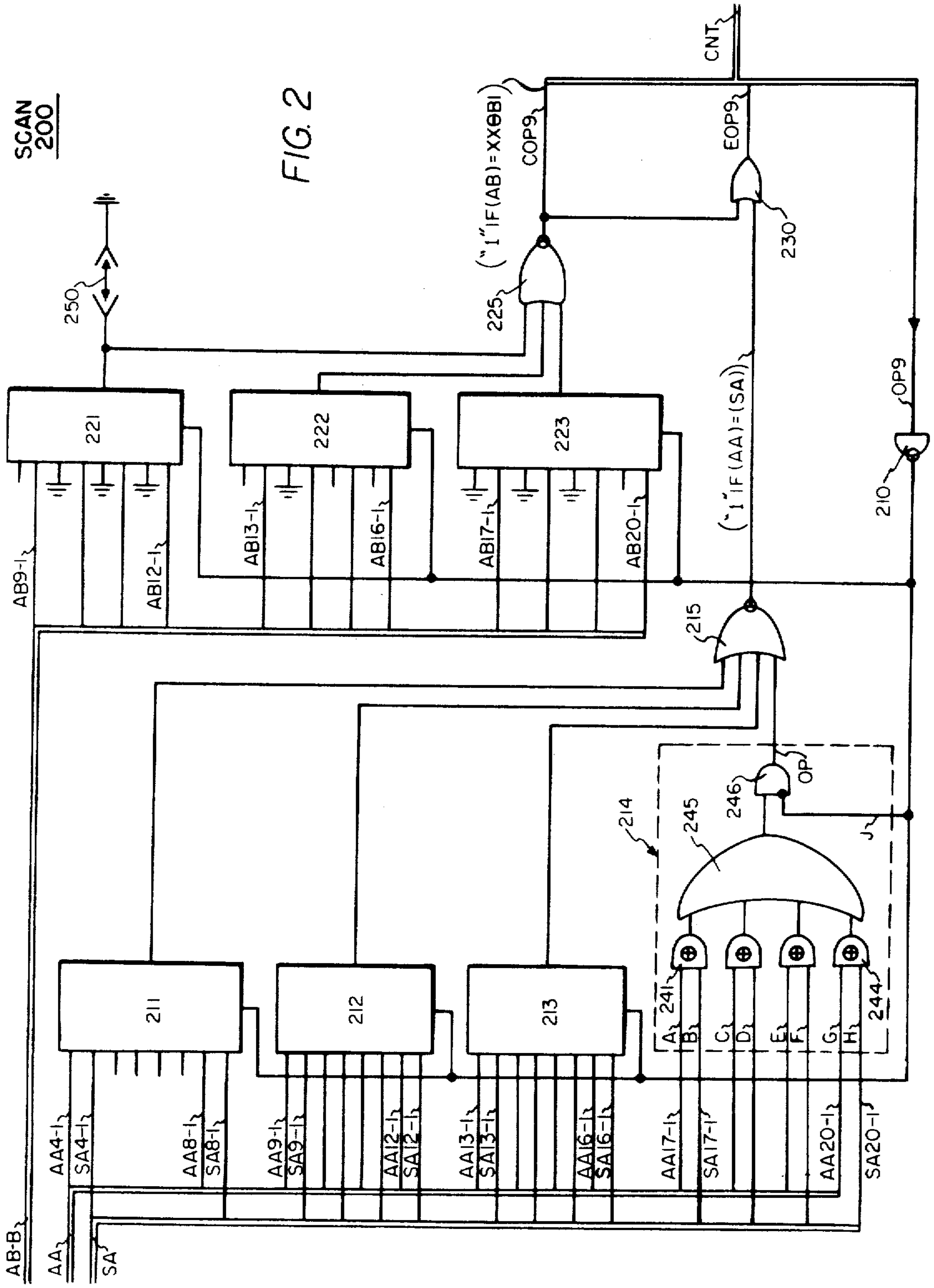
FIG. 2 is a functional block diagram of the comparators used for the operation code SCAN.

The comparison circuits for the SCAN operation are shown in FIG. 2. The basic comparison modules 211–214 and 221–223 each provide for comparing one set of four inputs to a corresponding set of four inputs. These modules may be of the type disclosed in U.S. Pat.

No. 3,478,314 by W. R. Wedmore for a Transistorized Exclusive or comparator. Block 214 is a symbolic functional equivalent of the module. It includes four exclusive OR gates 241–244, followed by an OR gate 245 and an output inhibit AND gate 246 to the output conductor OP. Each of the exclusive OR gates comprises a transistor with the two inputs connected via resistance and diode bias circuits to the base and emitter electrodes, the collector electrodes of the four transistors are connected together at a common point, and thence through a resistance-capacitance network to the base electrode of an output transistor, and the collector electrode of this last transistor is connected to the output lead OP. Another input from a terminal J is connected through a resistance network to the base electrode of the output transistor to act as an inhibit input. The Boolean equation for the Wedmore circuit or for the generally equivalent logic of block 214 is:

$$OP = J(AB + AB + CD + CD + EF + EF + GH + GH)$$

The outputs of the four comparator modules 211–214 are connected to respective inputs of a NOR gate 215. The J inputs of the four modules are connected in common to the same source. The result is that if the logic level at input J is 0 and the signals on two sets of inputs compare so that each signal in one set is equal to its respective signal in the other set then the output of the NOR gate 215 is a 1. The specific inputs in this case are the set of conductors AA (from accumulator AA) and the set of conductors SA (from the store register SA). For the particular system requirements the first comparator module 211 has its upper pair of inputs connected to the leads from the fourth bit position of each of the conductor sets AA and SA and its lower pair of inputs to the eighth bit positions; while the inputs for the other three comparator modules run from the ninth bit position of each set at the upper inputs of module 212 to the leads from the twentieth bit position of each set at the lower inputs of module 214; corresponding to the last three digit positions of the data stored in the accumulator AA and the storage register SA.

The three comparator modules 221–223 along with NOR gate 225 are used in a similar manner to compare the contents of the last three digit positions of the accumulator AB with a wired constant. The specific constant shown has the value θB1 corresponding to the binary number 1010 1011 0001, with the 1's and 0's provided by open circuit and ground potentials respectively. Thus if a five digit number is stored in the accumulator AB, the first two digits may be any value as far as operation of comparator is concerned which may be indicated by an X; so that the output of NOR gate 225 has the value of 1 if the contents of the accumulator AB has the value XXθB1. This signal appears on the lead COP9 in FIG. 2.

To appreciate the significance of the particular constant, please note that the sixteen possible values for the four-bit binary coded digit are as explained in column 7 of the Duthie et al patent are 0 for the null value 0000, followed by the values 1–9, then θ for the value 1010 followed by the values B–F in which the bits have the weight 8-4-2-1. The symbol θ is used to correspond to the 0 of telephone directory numbers because it is usually transmitted as 10 pulses in dialing. Thus each digit position of a directory number may have any one of the 10 values 1–θ, and for a block of a thousand numbers they may have the value X111–Xθθθ. Thus if a block of 1,000 numbers is being scanned the last number would have the value Xθθθ. The operation of the counting circuits is such that the last three digits for the next count would have the value θB1; so that this constant indicates that all thousand numbers have been scanned and the counter has advanced to the next step.

An option is provided in the comparison circuits to connect the output of the comparator module 221 via a strap 250 to a ground terminal, which has the effect of eliminating the corresponding digit from the comparison so that only the last two digits are compared and the constant becomes equal to XXXB1, which permits one hundred numbers to be scanned at a time.

The J inputs of both sets of comparator circuits 211–214 and 221–223 are connected via the output of an inverter 210 from the conductor OP9 from the instruction register decoder. The outputs from the two NOR gates 215 and 225 are connected to respective inputs of an OR gate 230, the output of which is connected to a conductor EOP9. Thus when the signal OP9 is 1; and when the contents of accumulator AB has its last three digits (or two digits if the wired option is used) are equal to the constant the signals on leads COP9 and EOP9 both become 1; and when the contents of accumulator AA compare to the contents of the store register SA the output of NOR gate 215 is 1 which causes the signal on lead EOP9 to also be 1.

In an alternative embodiment not shown the inputs for the constant at the comparator modules 221–223 may be connected to the outputs of another temporary memory register, so that any desired constant may be stored therein under programmed control for use in making the comparison.

Figure 3:
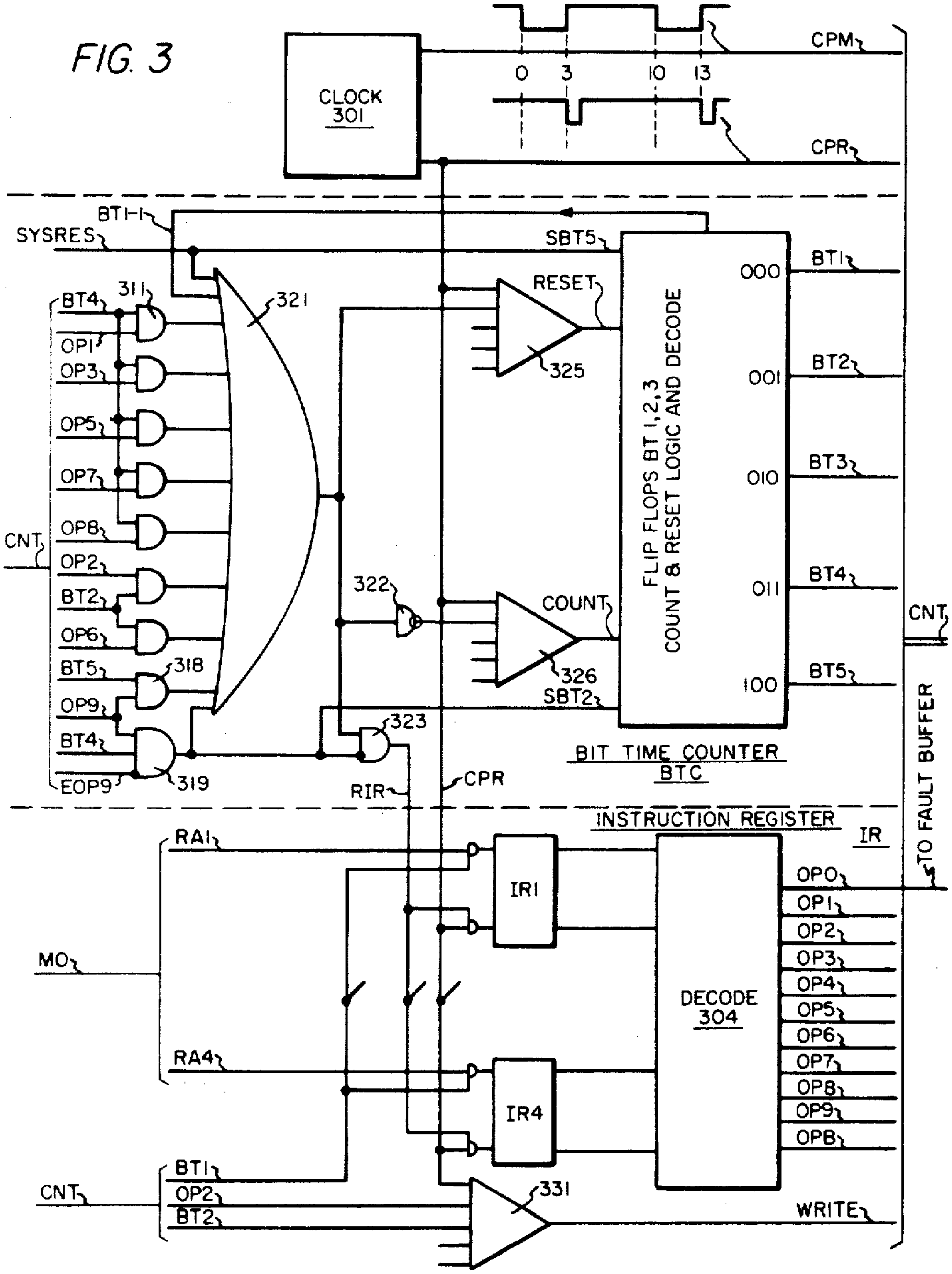
FIGS. 3–7 are functional block diagrams of the registers and logic circuits of other portions of the central processing unit, of the memory input, and of general storage registers.
Figure 4:
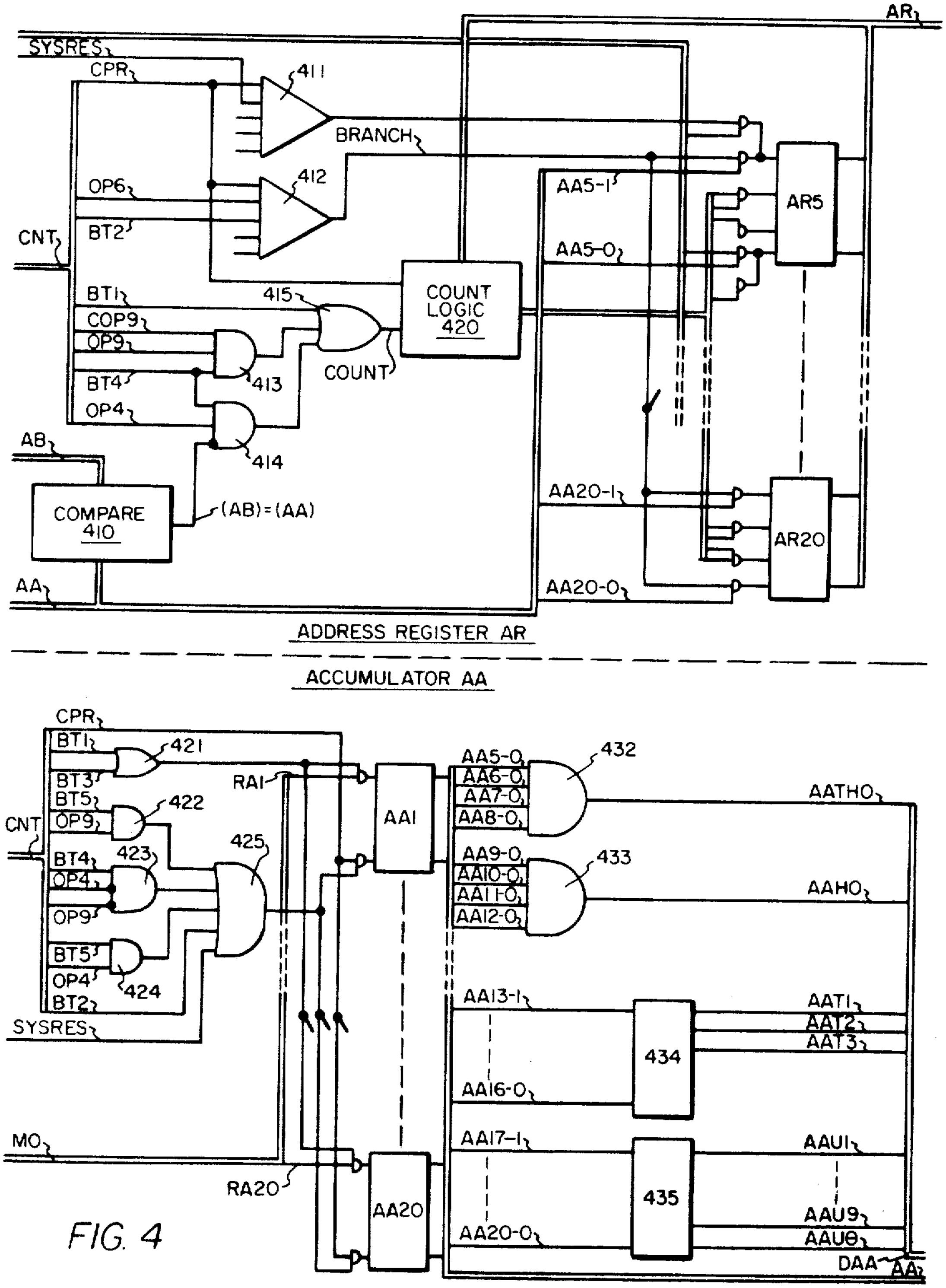

In FIG. 3 the clock is shown as block 301 which supplies the recurring pulse trains as indicated by the graphs on lead CPM and CPR. The pulses on lead CPM are used principally to enable the memory driver circuits, and the pulses on lead CPR are used as AC inputs to the gated pulse amplifiers and the coincidence gates of the flip-flops to control the timing of the change of state.

The bit time counter BTC counts from one to five. Every operation (OP) code begins with bit time BT1 and the counter advances by one on every CPR clock pulse. However some operations can be conducted in fewer bit times than others. The counter comprises three flip-flops BT1, BT2, and BT3, which along with the counting and reset logic and decoding circuits is represented by clock 310. The states of the flip-flops for each output state are shown along the right side of this block, the state 000 being decoded as output BT1, etc. up to the state 100 being decoded as output BT5. The counter advances by one or reset on each pulse from lead CPR as controlled by the gated pulse amplifiers 325 and 326. Normally the output of OR gate 321 is at the level 0 so that the gated pulse amplifier 325 is inhibited and gated pulse amplifier 326 is enabled via inverter 322, so that the counter advances on each occurrence of a pulse on lead CPR. Reset is controlled by gates 311–319 connected to the inputs of OR gate 321. State BT4 causes resetting for codes OP1, OP3, OP5, OP7 and OP8; state BT2 causes resetting for codes OP2 and OP6, and for code OP9 the resetting may occur either with state BT4 or BT5. Also any time the flip-flop BT1 is in the set state, which will only occur for state BT5, the signal on lead BT1-1 will cause reset. The system reset signal on lead SYSRES also enables the reset and via the signal on lead SBT5 in conjunction with the signal on lead RESET forces the counter to state BT5. A signal on lead SBT2 in conjunction with the signal on lead RESET will force the counter to state BT2.

Code OP9 is the only operation code which will cause the bit time counter to reset to a state other than BT1. If comparison is not found, that is the contents of accumulator register AA are not the same as the contents of the storage register SA, and the address in the accumulator AB is not equal to the constant, then the signal on lead EOP9 is at 0; so that during the state BT4 gate 319 has at its output the signal condition 1. This causes the signals on leads SBT2 and RESET to be 1 so that the counter is set to state BT2. When either comparison indicates equality, then the signal on lead EOP9 is at signal level 1 so that gate 319 is inhibited and the counter advances to state BT5. Then on the next clock pulse the output from gate 318 will produce the reset condition to change the state to BT1. Thus it may be seen that when the central processor is in the state with code OP9, which is the SCAN mode, the bit time counter recycles skipping state BT1 and goes directly from state BT4 to BT2. Since state BT1 is the state for reading instructions from the memory, no instruction is read and the processor remains in the same state OP9.

The instruction register IR comprises four flip-flops IR1-4. This register receives information in parallel from the memory output read amplifiers via leads RA1-4 during interval BT1, the signal on lead BT1 supplying the DC input to the set coincidence gates, and the signals on leads RA1-4 supplying the AC inputs to load the flip-flops. The information stored in these flip-flops is the operation (OP) code, which is decoded by the logic 304. The output on lead OP0 is an invalid code which indicates that an instruction was not read, probably due to an open diode or other fault in the memory; so this output is used by the fault buffer. The outputs OP1-OP9 correspond to the operation code previously described. Since the digit comprises four bits the output could be expanded to a maximum of fifteen outputs other than the zero output. One such additional output OPB is shown.

A reset control from gate 323 associated with the bit time counter BTC provides a means of setting the instruction register back to zero after the execution of each instruction by supplying a DC input to the reset coincidence gates, with the lead CPR connected to the AC inputs to clock the reset. Note that the reset command is supplied whenever a signal is received from the OR gate 321 for resetting the bit time counter flip-flops; except that it is inhibited by the output of gate 319 during the SCAN operation for code OP9. This permits the instruction register to remain set at the state OP9 while the bit time counter cycles skipping the interval BT1.

A gated pulse amplifier 331 enabled by DC signals on leads OP2 and BT2 gates a clock pulse from lead CPR to generate a signal on lead WRITE, which is used to write the information into the temporary memory flip-flops during the STORE operation.

The outputs of the clock 301, the bit time counter BTC and the instruction register IR are shown combined as a set of conductors CNT, at least some of these signals being used by most of the other blocks of a central processing unit and also the memory input register.

The address register AR in FIG. 4 stores the address to be executed next. It comprises flip-flops AR5-20 and associated logic circuits. The count logic circuits 420 cause the address to be incremented by one during the occurrence of a pulse on lead CPR when the signal on lead COUNT is 1, which occurs via OR gate 415 every cycle during the first bit time interval by the signal on lead BT1, and also conditionally during interval BT4 for the execution of codes OP4 and OP9.

The compare logic for code OP4 shown as block 410 (which is not part of the address register but is shown here for convenience) compares the contents of the accumulator registers AA and AB, and supplies an output signal which inhibits gate 414 when the comparison indicates that the contents are equal. Thus if a comparison is true the register advances only once during the cycle on the occurrence of a signal on lead BT4 as normal and the next instruction in sequence is executed next; while if the comparison indicates an inequality of the two sets of data, gate 414 is not inhibited so that during the occurrence of signal on lead BT4 the register is advanced an additional step causing one instruction to be skipped.

During the SCAN operation (OP9) the address register is incremented once during the first cycle when the instruction is read during the interval BT1 as normal, and during subsequent cycles the interval BT1 is skipped by the bit time counter so that the address register does not advance further. The end of the operation occurs when a comparison is found in FIG. 2 either via gate 215 or 225, which can never occur at the same time. A 1 output from gate 215 indicates that the associative search has been completed by finding the word having the data corresponding to that in the register SA; in which case no further signal is supplied to the address register and the instruction already there is used next. However, if the address stored in accumulator AB which corresponds to the wired constant is reached, then the signal on lead COP9 at gate 413 during the occurrence of interval BT4 causes the address register to be incremented one additional step, so that an instruction is skipped. This causes entering a segment of a program to store data indicating that the search should be continued at a later time in the program, or that the search is to be terminated upon not finding a matching condition.

The branch instruction command OP6 along with the signal on lead BT2 is used to enable gated pulse amplifier 412 to pass a pulse from lead CPR to supply AC signals to set and reset inputs of the flip-flops to load data from the accumulator AA.

In addition the reset signal on lead SYSRES enables gated pulse amplifier 411 to supply reset signals to set the register to designated start addresses for the main or standby programs.

The accumulator AA comprises twenty flip-flops AA1-20. This register receives the information in parallel from the memory output read amplifiers via the twenty leads RA1–20 to the AC set inputs; the DC inputs being enabled during bit time intervals BT1 and BT3 via OR gate 421. The register is reset by a pulse on lead CPR when the reset DC inputs are enabled by a signal from OR gate 425; which occurs during interval BT2 of every cycle, during interval BT5 for the codes OP9 and OP4 via gates 422 and 424 respectively, during interval BT4 for all other operation codes via gate 423, and also when the system reset signal is present on lead SYSRES.

The output of accumulator register AA is also used for the STORE operation code OP2 during the interval BT2 as the operand address indicating into which register the information from accumulator AB is to be written. The output for the digit AA5–8 is decoded by gate 432 as the thousands digit on lead AATHO, and for the digit AA9–12 by gate 433 as the hundreds digit on lead AAHO, since these two digits for the temporary addresses are always 00. The digit AA13–16 is decoded by logic 434 to provide the tens digits AAT1, AAT2, or AAT3; and the digit AA17–20 is decoded by logic 435 to provide a units digit signal on one of the leads AAU1–AAU0.

Figure 5:
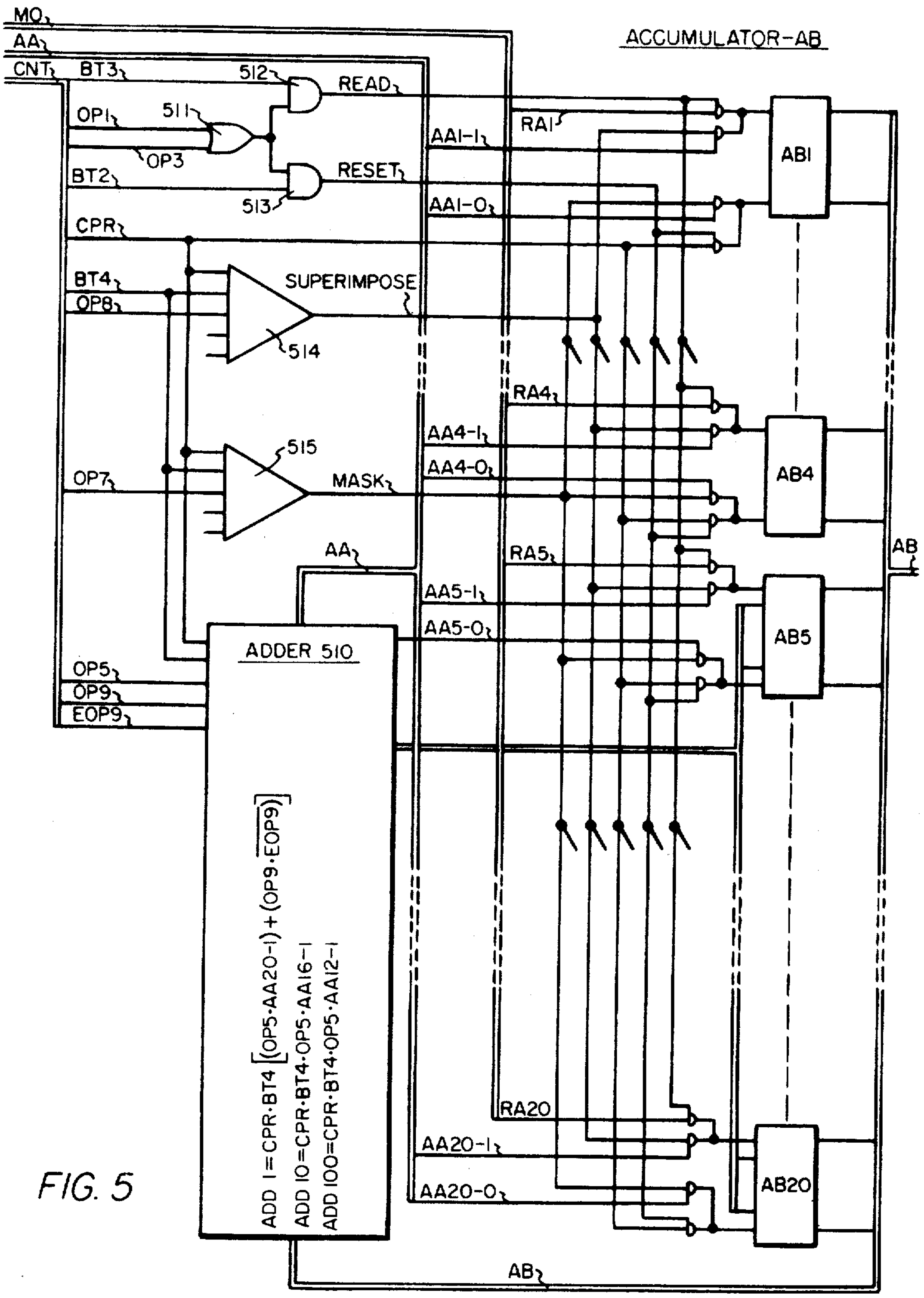

The accumulator AB shown in FIG. 5 comprises twenty flip-flops AB1–20. This register stores the output result for most of the operations, and also supplies part of the input data for many of them.

For the load and transfer operations, accumulator AB receives information directly from the memory output read amplifiers via the conductors RA1–20 to the AC inputs of one set of coincidence gates. For these operations the code OP1 or OP3 via OR gate 511 enables gates 512 and 513 so that during the bit time interval BT2 gate 513 supplies DC reset commands to a set of coincidence gates to reset all of the flip-flops on the occurrence of a pulse on lead CPR, and then during the interval BT3 gate 512 supplies a read command to the DC inputs of the set coincidence gates to load the information from the memory output.

Adder logic 510 provides the addition logic indicated by the Boolean equations within the box. This logic includes set and reset coincidence gates for the flip-flops AB5–20 having AC inputs from lead CPR, and logic for the DC inputs thereof which is actuated during bit time BT4 to add 1, 10 or 100 to the contents of the flip-flops AB5–20. For the add operation OP5, the data 1, 10 or 100 is stored in accumulator AA as a bit in the corresponding one of the flip-flops AA20, AA16 or AA12 respectively. For the SCAN operation OP9, the address in flip-flops AB5–20 is incremented by one during bit time BT4 as long as the signal on lead EOP9 has a value 0.

The mask and superimpose operations OP7 and OP8 control the gated pulse amplifier 515, 514 respectively during the interval BT4 to supply a clock pulse from lead CPR to the AC inputs of coincidence gates to cause information from accumulator AA at the DC inputs of the coincidence gates to be masked via reset inputs, or superimposed via set inputs respectively.

The memory input register MI comprises flip-flops MI5–20, as shown in FIG. 6. The instruction for the next cycle is transferred from the address register AR via the leads AR5–1 to AR20–0 inclusive connected to the DC inputs of respective coincidence gates; which are clocked via signals from gated pulse amplifier 631 when enabled by a DC signal from OR gate 625, which occurs during bit time BT2 for code OP2 via gate 621, during bit time BT5 during codes OP4 or OP9 via gates 623 or 624 respectively, and for other codes during bit time BT4 via gate 622.

The data address from accumulator AB is transferred via DC inputs of set and reset coincidence gates which receive AC input pulses from gated pulse amplifier 632 when enabled during bit time BT2 and the operation codes OP3 or OP9 via OR gate 626.

The data address from accumulator register AA is transferred via DC inputs of set and reset coincidence gates which are clocked via a signal from gated pulse amplifier 633 when enabled during bit time BT2 and any of the operation codes OP1, OP4, OP5, OP6, OP7 or OP8 via OR gate 627. The output of the memory input register is decided via the circuits 610 comprising logic circuits 611 for the first address digit from flip-flops MI5–8, decoding logic 612 for the second address digit from flip-flops MI9–12, via decoding logic 613 for the third digit from flip-flops MI13–16, and decoding logic 614 for the fourth digit from flip-flops MI17–20. The first two digits are used by the memory drivers 602 which require an enabling clock pulse on lead CPM. The last two digits are used by the memory switches 603.

As shown in FIG. 7, a storage register SA comprising flip-flops SA1–20 has an address 0021, a storage register SB comprising flip-flops SB5–20 has an address 0022, a storage register SC comprising flip-flops SC5–20 has an address 0023, and a storage register SD comprising flip-flops SD5–20 has an address 0024. Data may be stored in these registers from the accumulator AB via connections to the DC inputs of set and reset coincidence gates as shown. During the store operation in interval BT2 the signal on lead WRITE from gated pulse amplifier 231 (FIG. 3) supplies a clock pulse to the four gated pulse amplifiers 721–724. If one of these gated pulse amplifiers has its address stored in accumulator AA the signals from the set of conductors DAA via bus AB–B enables its DC inputs so that the clock pulse is gated to the AC inputs of the coincidence gates of the corresponding storage register to cause a transfer of the data from accumulator AB. To load information from one of these storage registers into the accumulator AB during the load operation one of the storage readout circuits SR21–SR24 is used. These storage readout circuits are disclosed in said Memory Arrangement patent application by R. M. Thomas. Each of them has an input shown via bus RA–B from the memory driver MD00, and from the memory switches on one of the leads MS21–MS24 corresponding to the last two digits of its address. When both the memory driver and the memory switch of one of the storage readout circuits is enabled the data from the corresponding storage register is supplied via the set of conductors comprising bus RA–B to the read amplifiers 102 (FIG. 1) and then via the memory output bus MO to accumulator AB.

The output from the flip-flops SA1–20 is also supplied via the set of conductors SA to the scan unit 200 for use in the SCAN operation OP9.

Shift Apparatus and Operation

Special storage readout circuits SR51 and SR52 (FIGS. 7 and 8) are also provided for shift left and shift right operations using the contents of storage register SA. Thus the load instructions OP1 with address 0051 (instruction 10051) will cause the contents of the storage register SA to be loaded into accumulator AB shifted one digit (four bits) to the left. That is the bits SA5–20 are loaded into flip-flops AB1–16 and zero's are loaded into flip-flops AB17–20.

In like manner the storage readout circuits SR52 may be used to shift the information from storage register SA one digit (four bits) to the right. Thus the instruction 11052, which provides the code OP1 and the address 0052, causes the storage read-out circuit SR52 to be enabled to place the information from flip-flops SA1–16 into the accumulator register flip-flops AB5–20, and the digit zero will appear in flip-flops AB1–4.

Note that for additional parallel shift operations, the contents of accumulator AB must be stored in storage register SA before this shift instruction is repeated. No apparatus need be added to the system to provide the two shift functions other than the storage readout circuits SR51 and SR52 and their connections to the storage register SA and to the load bus RA–B.

To provide rotate functions it would only be necessary to add storage readout circuits connected similarly to those for shift function, except that the connections for the four bits of the digit at one end of the storage register should be connected to the four bits at the opposite end of the inputs of the storage readout circuit. For example the rotate left function would be connected similarly to storage readout circuit SR51 with flip-flops SA1–4 having their outputs connected respectively to the inputs I17–I20 of the storage readout circuit; and the rotate right function would be provided with a storage readout circuit similar to SR52 with flip-flops SA17–20 connected to the inputs I1–I4 respectively.

Figure 8:
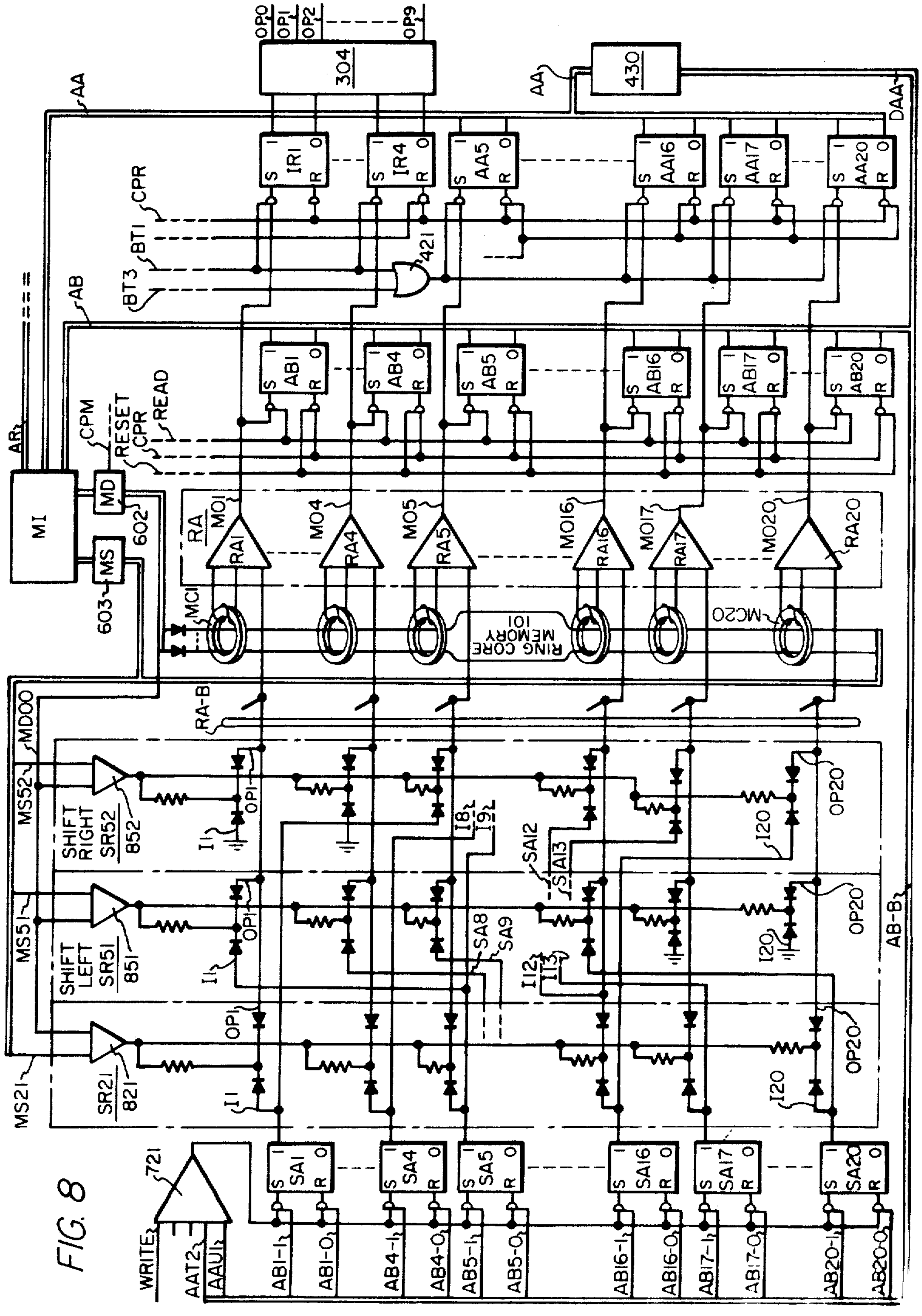
FIG. 8 is a functional block diagram of part of the apparatus of FIGS. 3–7 illustrating the flow of data for the shift functions.

Some of the apparatus of FIGS. 3–7 involved in the shift function is shown in a functional block diagram in FIG. 8, with the gates of the storage readout circuits shown schematically. The storage readout circuits, read amplifiers RA, memory drivers MD, and memory switches MS are shown in schematic detal in said Memory Arrangement patent application by R. M. Thomas. Each of the storage readout circuits comprises twenty individual gates each comprising two diodes and a resistor, and a common priming circuit such as 821 for the storage readout circuit SR21. The twenty gates of each storage readout circuit have respective inputs I1–I20 and respective outputs OP1–OP20. In each gate the anode of one diode is connected to the input and the anode of the other diode is connected to the output, with the cathodes connected together and via a resistor to the output of the priming circuit. The priming circuit biases the diodes such that normally the input and output are isolated for data signals, and when the priming circuit is actuated by the memory driver and switch inputs the twenty gates are enabled so that the data contents of the store register flip-flops are coupled into the respective read amplifiers.

The ring core memory 101 is described in both said System patent by R. W. Duthie et al and in said Memory Arrangement patent application by R. M. Thomas. It comprises a set of ring shaped cores of linear ferrite material MC1–MC20 through which word wires are selectively thread, with each word wire passing through a core for a binary one and around a core for a binary zero, two of these word wires being shown in FIG. 8. A plurality of modules comprising twenty cores each may be provided to accommodate all of the word wires required in the system. Each core has an individual sense winding coupled to the input of a corresponding one of the read amplifiers.

The operation codes involved overall for the shift function are of the write-control and read-control type. For write-control in this system is the STORE code OP2; and for the read-control operation there are the LOAD code OP1 and the TRANS code OP3. As shown in FIG. 3, the signal on lead WRITE is generated by the gated pulse amplifier 331 in response to the control signals on leads OP2 and BT2 and the clock pulse on lead CPR; and as shown in FIG. 5 the signal on lead READ is generated by gates 511 and 512 by a signal on lead BT3 and a signal on either of the leads OP1 or OP3. For either of the read operations, gate 513 during bit time BT2 provides a signal on lead RESET which in coincidence with a clock pulse on lead CPR resets the accumulator flip-flops AB1–20, and then during bit time BT3 the signal from gate 512 on lead READ causes the data on the memory output conductors RA1–20 to be loaded into these flip-flops. For the performance of a shift operation, the program will cause data to appear in the accumulator flip-flops AB1–20. In the assembler source statements the operation codes are given by mnemonic expressions such as LOAD and STORE, and the operand addresses may be expressed by mnemonic labels which are SA for address 0021, SALF for address 0051, and SART for address 0052. Thus for example the assembler source statement LOAD SALF becomes machine instruction 10051.

The program for the system must provide that before performing a shift operation appropriate data appears in the accumulator flip-flops AB1–20. Then a STORE SA instruction (20051) is used to store the data in the store register SA. During execution of this instruction, during bit time BT1 the corresponding word wire in the ring core memory 101 is read with the digit 2 appearing in the flip-flops IR1–4 and the operand address 0021 appearing in the flip-flops AA5–20. The decoding logic 304 decodes the code OP2 and the decoding logic 430 which is shown in more detail in FIG. 4 as 432, 433, 434 and 435 provides the signals via the set of conductors DAA and the bus AB-B to gated pulse amplifier 721, these being AAT2 and AAU1. The thousands and hundreds digits do not need to be supplied to the gated pulse amplifier 721 since they are always 00. When the signal on lead WRITE becomes true the data is stored into the flip-flops SA1–20. If a shift left operation for example is required a subsequent instruction, which need not necessarily be the next in sequence, LOAD SALF (10051) will be used. As shown in FIG. 6, during bit time BT2 the gated pulse amplifier 633 is enabled to gate the clock pulse from lead CPR to lead MAA to cause the operand address from the flip-flops AA5–20 to be placed in the memory input flip-flops MI5-20. The decoding circuits cause signals to be supplied to the memory driver MD00 and the memory switch MS51, and the occurrence of the clock pulse on lead CPM actuates the driver, which in turn actuates the priming circuit 851 of the storage readout circuit SR51. This causes the data from the outputs of the flip-flops SA1-20 to be coupled to the read amplifiers RA1-20, and in response to the signal on lead READ this data is placed into the accumulator flip-flops AB1-20, shifted one digit to the left with respect to the data in the store register SA. To shift the data additional digits to the left it would be necessary to repeat the STORE SA and LOAD SALF instructions. The shift right operation is similar using the STORE SA and LOAD SART instructions.

What is claimed is:

1. In a digital data processing system having a central processing unit and a main memory;

wherein the main memory comprises a plurality of word stores for program words and data words, the program words having a first part for an operation code and a second part for an operand address, the operation codes including at least one write-control code and at least one read-control code, a memory input register for addresses designating the individual word stores, read-access means connected to read out a word from a store corresponding to the address in the memory input register and to supply signals representing the word to a set of memory output conductor means number 1 through N;

wherein the central processing unit comprises memory output register means (AA), an accumulator register (AB) comprising a plurality of bistable devices numbered 1 through N, an instruction register with operation code decoding means, arithmetic circuits, and interconnections among them and to the memory input register and memory output conductors, operation cycling means providing operation cycles comprising sequential steps;

wherein the combination of the central processing unit and memory includes instruction reading means effective during a first step of each operation cycle using said read-access means to read out one program word from memory with the operation code into the instruction register and the operand address into the memory output register means, execution means using the arithmetic circuits to perform an operation designated by the operation code, which for said read-control operation codes includes data reading means effective during a subsequent state of the operation cycle for placing the data word address into the memory input register and using the read-access means to read out a corresponding data word into the memory output register means, and means effective during the operation cycle to place an address of a program word into the memory input register for the next operation;

a store bus comprising a plurality of data conductor means numbered 1 through N connected respectively to outputs of like numbered ones of the bistable devices of the accumulator register, a load bus comprising a plurality of data conductor means coupled respectively to like numbered ones of the memory output conductor means;

a plurality of store registers separate from said main memory each comprising a plurality of bistable devices with numbers from the set of numbers 1 through N, each store register having an individual address, input gate means coupling the bistable devices of each store register respectively to like numbered ones of the data conductor means of the store bus; an individual storage readout circuit for each store register including output gate means coupling outputs of the bistable devices respectively to like numbered ones of the data conductor means of the load bus;

wherein the execution means includes write-control means effective responsive to a write-control operation code to perform a write operation which includes means to enable the input gate means of a store register having its address in the memory output register means to thereby set the bistable devices of that store register to states corresponding to those of respective like numbered bistable devices of the accumulator register;

wherein said read-access means includes said storage read-out circuits, means including address decoding circuits connected to outputs of the memory input register to select one of the storage read out circuits when the address of its store register is in the memory input register to enable the output gate means thereof so that responsive to a program word with a read-operation code and the address of a storage readout circuit said data reading means is effective to set the accumulator register means to correspond to the states of the bistable devices of the store register connected to the selected storage readout circuit;

wherein one (SA) of the store registers has connected thereto at least one extra storage readout circuit having an alternate address different from the individual address normally assigned to that store register, with the output gate means having special connections to couple the outputs of the bistable devices to data conductor means of the load bus whose numbers differ by a value M from the numbers of the bistable devices to whose outputs they are normally coupled, so that, responsive to a program word having a read-control code and the operand address for said extra storage readout circuit said data reading means is effective to set the bistable devices of the accumulator register to correspond to the states of said one store register bistable devices whose numbers differ by said value M from those of the accumulator register in accordance with said special connections.

2. In a digital data processing system, the combination as claimed in claim 1, wherein there are two of said extra storage readout circuits, designated respectively as shift left and shift right storage readout circuits;

wherein the output gate means of the shift left storage readout circuit couples the conductor means numbered 1 through N minus M of the load bus to outputs numbered M plus 1 through N of said one store register, and coupling the last M conductor means of the load bus to a source for placing a signal condition representing zero on these last M conductor means so that responsive to a program word having a given read-control code and the address of the shift left storage readout circuit data from said one store register is placed in the accumulator register shifted M bits to the left;

wherein the output gate means of the shift right storage readout circuit couples the conductor means numbered M plus 1 through N of the load bus to outputs numbered 1 through N minus M of said one store register, and coupling the first M conductor means of the load bus to a source for placing a signal condition representing zero on these first M conductor means, so that responsive to a program word having the given read-control code and the address of the shift right storage readout circuit data from said one store register is placed in the accumulator register shifted M bits to the right;

whereby program words having the same given read-control code (LOAD) are effective to read data from a memory word store or a store register, or to shift data from said one store register M bits either left or right, depending only on the operand address in the program word with said given read-control code.

* * * * *